July 21, 1925.
G. A. SMITH
1,547,005
TESTING IMPLEMENT
Filed Aug. 11, 1923
2 Sheets-Sheet 2
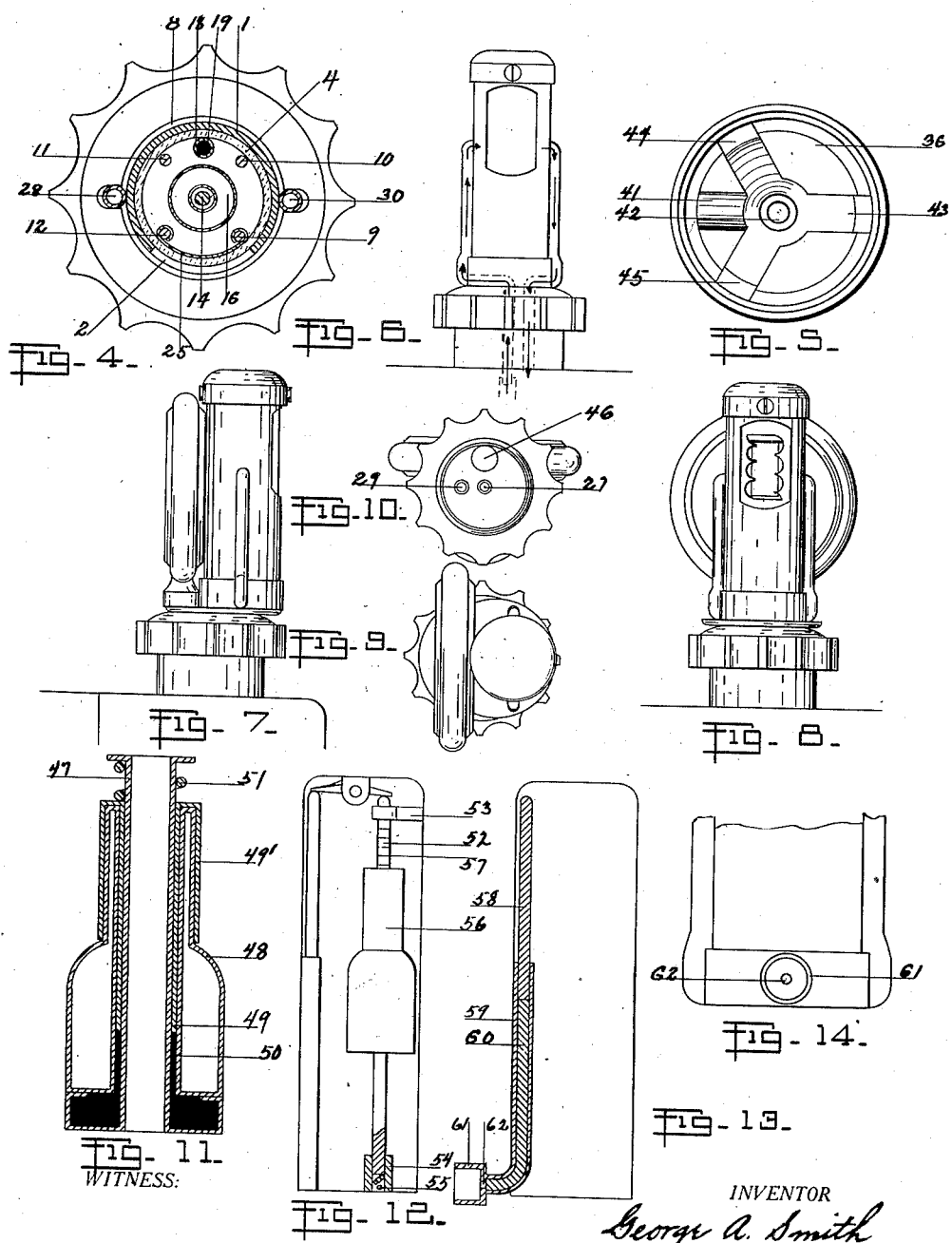
INVENTOR
George A. Smith
BY
Wm. D. Shoemaker
ATTORNEY

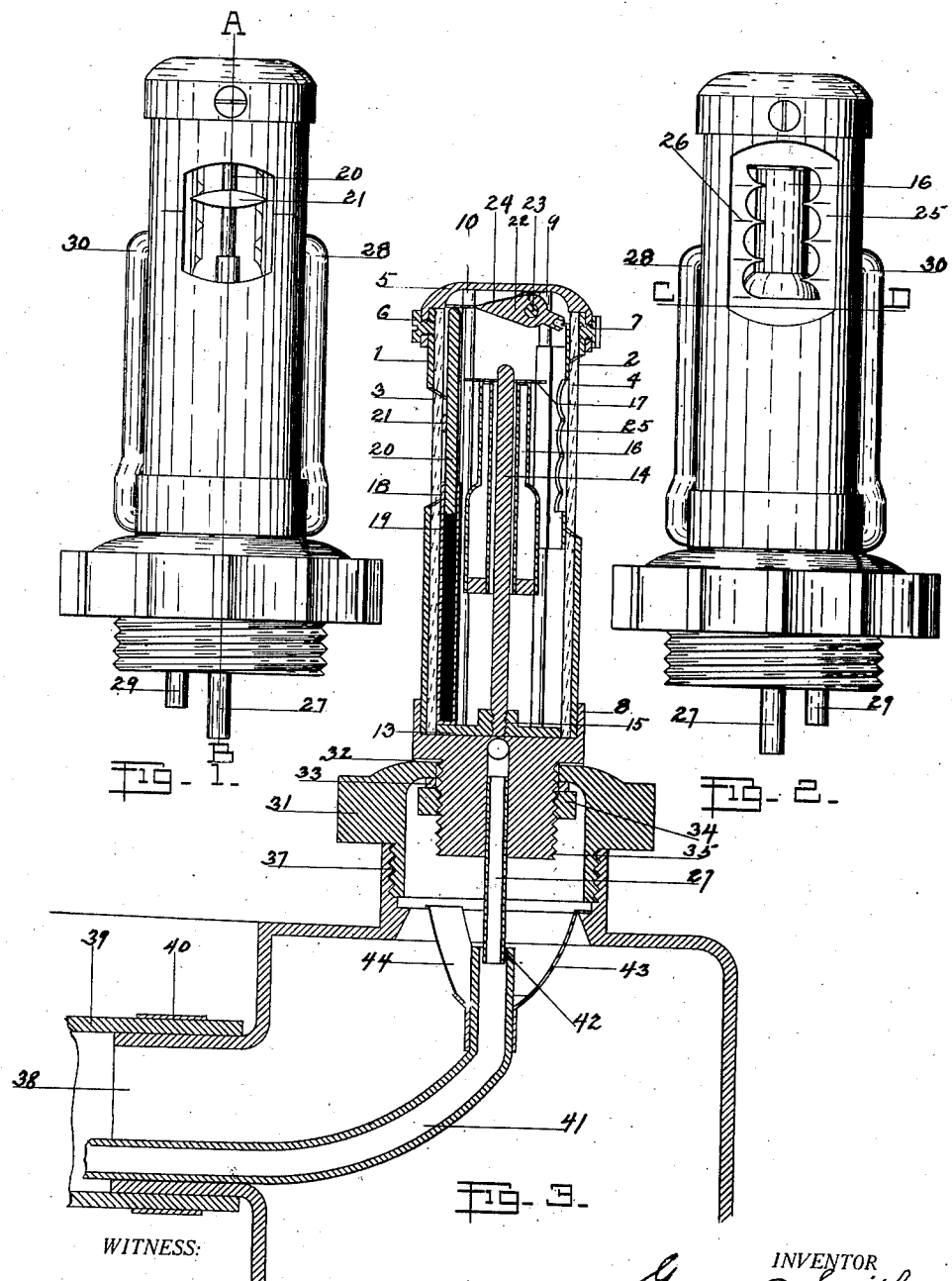

Patented July 21, 1925.

1,547,005

UNITED STATES PATENT OFFICE.

GEORGE A. SMITH, OF BALTIMORE, MARYLAND.

TESTING IMPLEMENT.

Application filed August 11, 1923. Serial No. 656,888.

*To all whom it may concern:*

Be it known that I, GEORGE A. SMITH, a citizen of the United States, residing at Baltimore, State of Maryland, have invented certain new and useful Improvements in Testing Implements, of which the following is a specification.

This invention relates to testing implements and more particularly to such an instrument in which a hydrometer reading is corrected automatically by a heat responsive element.

The invention has for its object the provision in a single instrumentality means for determining the density of a liquid, means for correcting the reading of said density due to variations in temperature, and means for indicating the temperature of the liquid. Another object of the invention is the provision of such a measuring instrument upon the water cooling system of a gas engine. A still further object is the production of a novel construction of parts whereby cooling liquid in a circulating system is led to a special chamber containing the measuring instrument located at a point above the engine.

Other objects and advantages of the invention will hereinafter appear in the following description and the novel features thereof will be particularly pointed out in the appended claims.

Like reference numerals indicate like parts throughout the several figures of the drawings, in which—

Figure 1 is a rear elevation of my testing or measuring instrument,

Figure 2 is a front elevation thereof,

Figure 3 is a vertical sectional view taken upon the line A—B of Figure 1 and extended to include the upper end of an automobile radiator, Figure 4 is a horizontal sectional view through the lower portion of the instrument on the line C—D of Figure 2, Figure 5 is a plan of the liquid conveyer employed for conducting a supply of liquid into the instrument chamber, Figure 6 is a diagrammatic view showing the manner of circulating the liquid through the instrument chamber, Figure 7 is a side elevation of a modified form of instrument showing the present invention combined with a temperature indicator, Figure 8 is a front elevation, Figure 9 a plan and Figure 10 a bottom view of the combination of Figure 7, Figure 11 is an enlarged detail view of a hydrometer float having formed therewith a heat responsive device for making correction of the scale carried by the hydrometer float, Figure 12 is a modified form of my invention, in which the scale is upon the hydrometer supporting rod and showing the rod depressible under the influence of a heat responsive device for making correction of scale readings, Figure 13 is a sectional view of a modified form of heat responsive device, and Figure 14 is a front elevation of the lower end of such a modified heat responsive device.

The invention comprises a chamber shown mounted upon the cap of a radiator of an automobile, in which is placed a hydrometer and a heat responsive element. Provision is made for the conveying of liquid from the cooling system of the engine to this chamber so as to provide a circulation of liquid through the chamber as long as the liquid is circulating through the cooling system.

The heat responsive device through suitable connections controls the movement of the hydrometer scale for the purpose of correcting the readings thereof due to the variations in temperature of the liquid. These several parts will now be described in detail, after which a recital of their conjoint use will be given.

The wall of the instrument chamber comprises a metallic cylinder 1 supporting therein a tube of glass. The metallic cylinder is cut away at 2 to provide a front window, and at 3 to provide a rear window. The chamber is provided with a top 5 fitting snugly the upper end of the metallic cylinder and held in place by screws 6 and 7. The bottom 8 of the chamber is flanged to receive in an airtight manner the lower end of the cylinder 1 and tube 4.

Upright rods 9, 10, 11 and 12 extend from the top 5 to the supplemental bottom 13. Rising centrally from the supplemental bottom 13 is the hydrometer supporting rod 14, secured to the bottom 13 by means of the screw threaded connection 15. The hydrometer float 16 is mounted upon the rod 14 for vertical movement within the body of liquid in the chamber, and it carries a registering top plate 17.

A tube 18 is provided within the chamber, in which is placed a heat responsive medium, such as mercury, which expands upon an increase of temperature of the liquid and raises an operating rod 20, whose lower end rests upon the upper surface of the heat responsive device. The rod 20 carries a pointer 21, for a purpose hereinafter set forth. A lever 22 is pivoted at 23 to the under surface of the tube 5. A spring 24 tends to press one end of the lever 22 into contact with the upper end of the rod 20 and thereby maintain the contact between the lower end of the rod 20 with the heat responsive element 19. The lever 22 at its opposite end is provided with a notch cooperating with a flanged upper end of a scale 25 to control the vertical movement of said scale, which is slidably mounted upon the guide rods 9 and 12, as shown in Figure 4. The scale 25 is formed with a series of pointers 26 and the reading is made when the registering top plate 17 of the float coincides with one of these pointers.

It is necessary to have the chamber filled with the circulating cooling fluid. The bottom 8 is provided with a vertical bore in which is mounted the tube 27 communicating with a horizontal leg of an intake pipe 28 designed to conduct liquid into the chamber of the instrument. An overflow pipe 30 leads the fluid from the chamber to the cooling system through the medium of the short vertical tube 29. The circulation of the liquid through the instrument chamber is diagrammatically illustrated in Figure 6. It will be appreciated that if the liquid is forced into the chamber under pressure, it will fill the chamber but when the circulation ceases the liquid will fall to a constant level controlled by the overflow pipe.

The chamber is attached to the radiator cap 31 by providing an aperture therein through which the screw threaded end 35 of the bottom 8 projects. Suitable washers 32 and 33 are placed upon the threaded end 35 above and below the cap, and a nut 34 is utilized to clamp the bottom to the cap. The usual opening in the top of the radiator is provided and the cap is screwed therein as shown at 37.

The radiator is provided with a nipple 38, to which is clamped the hose end 39 by means of the clip or band clamp 40. Projecting into the hose connection just described is a curved tubular member or conveyer 41 whose upper end surrounds the lower end of the tube 27, as shown at 42. This end of the conveyer is supported in position by means of a spider comprising the prongs 43, 44 and 45. The prongs are made of spring material and have end portions which are held in place by the lower end of the cap 31. It will be appreciated that fluid is circulated through the cooling system of the engine passing forward through the hose connection 38—39 under the action of the water pump with such force as to cause some of the liquid to rise in tubes 41, 42 and 28 and into the instrument chamber. If it is found that the pressure produced by the water pump is not sufficient to accomplish this result, the relative sizes of the tube 41 and nipple 38 might be altered, or some form of cutoff device might be provided for a portion of the fluid as it passes through the nipple 38.

In Figures 7 to 10 there is shown a method of using my invention in connection with the usual moto-meter. This moto-meter is shown as mounted upon the cap of the radiator in close proximity to the instrument chamber of the present invention. It will be appreciated that a large aperture 46 is cut in the cap for the reception of the moto-meter end. However, it is not necessary to employ a temperature indicator of special design with my instrument, as the pointer 21 on the rod 20 may be employed in connection with a suitable scale on the rear window to indicate the temperature of the fluid. This pointer 21 is under the control of the heat responsive element in the instrument chamber.

In the hereinbefore described embodiment of the invention the hydrometer scale is a movable one and might be said to be upon the front window 2. In Figure 11 I have shown an enlarged float which carries the scale. In this form the hydrometer base 48 is mounted upon a sub-base carrying heat responsive fluid. The upper surface of this fluid is in contact with a sleeve 49, upon a depending flange of which the scale is placed. This scale carrying sleeve 49 is slidably mounted between portions of the hydrometer float and is held in its position shown in Figure 11 by means of a spring 51. The heat responsive element is mercury designated by the numeral 50, and it will be appreciated that under the influence of an increased temperature the mercury will force the sleeve 49 upward against pressure of the spring 51 when the scale 49' will be raised to compensate for the variation in temperature.

In Figure 12 I have shown a form of the invention in which the scale 57 is placed upon the supporting rod 52 for the hydrometer, and the reading is taken by the coincidence of the upper edge of the float upon the scale. The numeral 53 indicates an apertured lug in which the upper end of the supporting rod is slidably mounted, while 54 indicates a socket for supporting the lower end of the supporting rod. Within the socket 54 there is a spring 55, which acts to maintain the supporting rod in its uppermost position. When, however, the heat responsive element acts through a lever similar to that shown in Figure 2, the rod is depressed and the scale lowered to compensate for variations in temperature.

In Figures 13 and 14 I have shown a modified form of heat responsive device. The numeral 58 indicates the lever operating bar described in connection with my preferred form, while the numeral 60 indicates any flexible element which will act to raise the rod 58 when acted upon by a heat controlled element. The tube 59 contains the elements 58 and 60, at the lower end of which is a socket 61 having an opening 62, into which a wire, rod or the like is adapted to be inserted to force the element 60 up in said tube. Such a wire or rod is a well known element to indicate the temperature of the engine at a point removed therefrom. In this form of the invention, the heat responsive device which corrects the hydrometer scale readings is located outside of the hydrometer chamber.

From the foregoing the individual functions of the several parts of my invention will be clear. There remains to complete a full description of the invention a recital of the conjoint use of the parts. It will be appreciated that my instrument is designed primarily for use in testing of the freezing temperature of a mixture used in an automobile engine for cooling purposes. In such an instrument it is desirable to have it in full view of a driver of the automobile. I have therefore mounted the instrument upon the cap of an automobile radiator, and have provided means for forcing fluid into the instrument chamber in a manner to produce a circulation of the liquid therethrough while the engine is running, which will insure that the liquid whose freezing point is to be measured, will be indicative of the whole body of the cooling fluid. This result is produced by the conveyer 41, tube 27, intake 28, overflow 30 and discharge tube 29.

The body of the chamber having been filled with fluid up to the level of the overflow, a reading taken by means of the indicator 17 upon the scale 25 will give the freezing temperature of the cooling mixture, generally alcohol in water, it being understood that the scale has been prepared in terms of the freezing temperatures rather than in terms of actual densities. But the reading thus taken would only be true at one temperature and it is therefore necessary to make correction of such reading to compensate for variations in temperature of the fluid at the time of the test. For this purpose I have provided the heat responsive device 19 which acts upon the rod 20 and hence the lever 22 to lower the scale. It will be appreciated that a rise in temperature of the cooling fluid will result in a decreased density and a further submergence of the hydrometer. To compensate for this, it is necessary that the scale also be lowered, which is accomplished in the manner just described. This will be true also when the scale is upon the rod as shown in Figure 12, but when the scale is upon the float, as in the form of Figure 11, it is necessary that the upper end of the float carrying the scale rise as the float itself sinks in order to properly compensate for a change in temperature and a consequent change in density.

It is obvious that the instrument of this invention can be used as an indicator of the temperature of the cooling liquid by means of the marker or pointer 21 in connection with a scale upon the face of the chamber as viewed from the driver's seat. The heat responsive device for correcting the density readings will be utilized for the purpose of effecting the movement of the marker 21 for temperature readings.

Having described my invention, what I claim as new and desire to secure by Letters Patent is:

1. In a testing implement, a chamber, a hydrometer float therein, a scale cooperating with said float, means for maintaining a constant liquid level in said chamber, and means for moving said scale to compensate for variations in temperature.

2. In a testing implement, a chamber, a hydrometer float and cooperating scale therein, a heat responsive element, means for maintaining a constant liquid level in said chamber, and means under the control of said heat responsive element for moving said hydrometer scale to compensate for variations in temperature.

3. In a testing implement, a chamber, a hydrometer float, a cooperating scale and a heat responsive element in said chamber, means for maintaining a constant liquid level in said chamber, and connections between the heat responsive element and the scale for moving said scale upon variations of temperature of the liquid in said chamber.

4. In combination with the cooling system of an engine, of a chamber, a hydrometer float, cooperating scale and heat responsive element in said chamber, means for maintaining a circulation of engine cooling liquid in said chamber, and means under control of said heat responsive element for moving said scale to compensate for variations in temperature of said cooling liquid.

5. In combination with the cooling system of an automobile engine, a closed liquid chamber mounted above the radiator of said cooling system, means for conveying cooling liquid into said chamber, and an indicator for said liquid within said chamber.

6. In combination with the cooling system of an automobile engine, a closed liquid chamber mounted above the radiator of said cooling system, means for maintaining a circulation of cooling liquid through said chamber, and means within the chamber for indicating a quality of said liquid.

7. In combination with the cooling system of an automobile engine, a liquid chamber mounted upon the radiator cap of said cooling system, means for maintaining a circulation of cooling liquid within said chamber comprising an overflow pipe for establishing a liquid level, a density indicator and a heat responsive device within said chamber, and means controlled by the heat responsive device for moving the scale of the density indicator to correct the reading thereof due to variations in temperature of said cooling liquid.

8. In combination with an engine cooling system comprising a radiator, of a closed instrument chamber mounted above said radiator, means for supplying cooling liquid from said system to said chamber, and a heat responsive device within the chamber for indicating the temperature of the cooling liquid therein.

9. In combination with a liquid circulating system, of a closed chamber mounted above said system, means for circulating a portion of said liquid through said chamber, an element in said chamber responding to the temperature changes of said liquid, and means for visually indicating said temperature.

10. In combination with a liquid circulating system, of a closed liquid testing chamber mounted above said system, means for circulating a portion of said liquid through said chamber while the body thereof is circulating in the system, and a testing instrument in said chamber.

11. In combination with a liquid circulating system, of a closed chamber mounted above the system, means for circulating a portion of said liquid through said chamber while the body thereof is circulating in the system and establishing a definite liquid level in said chamber when the circulation ceases, and a testing instrument in said chamber.

In testimony whereof I affix my signature.

GEORGE A. SMITH.